(12) United States Patent
Burford et al.

(10) Patent No.: US 11,673,553 B2
(45) Date of Patent: Jun. 13, 2023

(54) CONTROL SYSTEM FOR A VEHICLE AND METHOD

(71) Applicant: Jaguar Land Rover Limited, Coventry (GB)

(72) Inventors: Robert Burford, Coventry (GB); Charlotte Cooke, Coventry (GB); David Armstrong, Coventry (GB)

(73) Assignee: JAGUAR LAND ROVER LIMITED, Coventry (GB)

( * ) Notice: Subject to any disclaimer, the term of this patent is extended or adjusted under 35 U.S.C. 154(b) by 513 days.

(21) Appl. No.: 16/336,368

(22) PCT Filed: Oct. 23, 2017

(86) PCT No.: PCT/EP2017/077028
§ 371 (c)(1),
(2) Date: Mar. 25, 2019

(87) PCT Pub. No.: WO2018/077813
PCT Pub. Date: May 3, 2018

(65) Prior Publication Data
US 2020/0023850 A1  Jan. 23, 2020

(30) Foreign Application Priority Data
Oct. 27, 2016 (GB) .................... 1618139

(51) Int. Cl.
*B60W 30/18* (2012.01)
*B60W 10/04* (2006.01)
*B60W 10/18* (2012.01)

(52) U.S. Cl.
CPC ...... *B60W 30/18118* (2013.01); *B60W 10/04* (2013.01); *B60W 10/18* (2013.01);
(Continued)

(58) Field of Classification Search
CPC ........... B60W 30/18118; B60W 10/04; B60W 10/18; B60W 2552/15; B60W 2520/10;
(Continued)

(56) References Cited

U.S. PATENT DOCUMENTS 7,349,776 B2  3/2008 Spillane et al.
2002/0029914 A1  3/2002 Schmidt
(Continued)

FOREIGN PATENT DOCUMENTS

EP  1 800 985 A2  6/2007
EP  1 826 055 A1  8/2007
(Continued)

OTHER PUBLICATIONS

Japanese Office Action corresponding to Japanese Application No. 2019-515958, dated Apr. 7, 2020, 6 pages.
(Continued)

*Primary Examiner* — Kenneth J Malkowski
*Assistant Examiner* — Andrew J Cromer
(74) *Attorney, Agent, or Firm* — Reising Ethington P.C.

(57) ABSTRACT

The invention provides a system (10) for a motor vehicle (100) that receives drive demand information (161S) indicative of an amount of drive demanded of a powertrain (129) of the vehicle (100), and controls an amount of drive torque applied by the powertrain (129) to one or more road wheels (111, 112, 114, 115) in dependence on the drive demand information (116S). The system also receives gradient information (11GS) relating to the driving surface and vehicle speed information (Sv). The control system, in dependence on the gradient and speed information, automatically causes a braking system (12d) to apply brake force to one or more of the wheels (111, 112, 114, 115) to prevent vehicle rollback, and adjusts the amount of brake force applied in dependence on the drive demand information (161S) to
(Continued)

cause the amount of brake force applied to increase progressively as the amount of drive demand decreases.

21 Claims, 6 Drawing Sheets

(52) U.S. Cl.
CPC ..... *B60W 2520/10* (2013.01); *B60W 2552/15* (2020.02); *B60W 2710/0666* (2013.01); *B60W 2710/083* (2013.01); *B60W 2710/18* (2013.01)

(58) Field of Classification Search
CPC ... B60W 2710/0666; B60W 2710/083; B60W 2710/18; B60W 30/18027; B60T 2201/06; B60T 8/885
See application file for complete search history.

(56) References Cited

U.S. PATENT DOCUMENTS

| | | | |
|---|---|---|---|
| 2007/0173372 A1 | 7/2007 | Ueno | |
| 2011/0065548 A1* | 3/2011 | Yu | B60W 30/18118 477/203 |
| 2011/0169323 A1* | 7/2011 | Tseng | B60W 10/06 303/191 |
| 2013/0060442 A1* | 3/2013 | Kaster | B60T 8/885 701/82 |
| 2013/0178332 A1* | 7/2013 | Kazama | B60W 10/184 477/21 |

FOREIGN PATENT DOCUMENTS

| | | |
|---|---|---|
| GB | 2492655 A | 1/2013 |
| GB | 2492748 A | 1/2013 |
| GB | 2499279 A | 8/2013 |
| GB | 2499461 A | 8/2013 |
| GB | 2507622 A | 5/2014 |
| GB | 2508464 A | 6/2014 |
| GB | 2527100 A | 12/2015 |
| GB | 2531777 A | 5/2016 |
| JP | H769102 A | 3/1995 |
| JP | 2007168565 A | 7/2007 |
| JP | 2008503377 A | 8/2008 |
| JP | 2009162291 A | 7/2009 |
| JP | 2009190648 A | 8/2009 |
| WO | WO 2013/124321 A1 | 8/2013 |
| WO | WO 2014/139875 A1 | 9/2014 |
| WO | WO 2017/085528 A1 | 5/2017 |

OTHER PUBLICATIONS

Patents Act 1977: Combined Search and Examination Report under Sections 17 and 18(3), UKIPO Application No. GB1618139.8, dated Apr. 25, 2017, 7 pp.
Patents Act 1977: Combined Search and Examination Report under Sections 17 and 18(3), UKIPO Application No. GB1717395.6, dated Apr. 23, 2018, 6 pp.
International Search Report and Written Opinion of the International Searching Authority, International Application No. PCT/EP2017/077028, dated Jan. 26, 2018, 13 pp.

* cited by examiner

CONTROL SYSTEM FOR A VEHICLE AND METHOD

RELATED APPLICATIONS

This application is a 35 U.S.C. § 371 national stage application of PCT Application No. PCT/EP2017/077028, filed on Oct. 23, 2017, which claims priority from Great Britain Patent Application No. 1618139.8, filed on Oct. 27, 2016, the contents of which are incorporated herein by reference in their entireties. The above-referenced PCT International Application was published in the English language as International Publication No. WO 2018/077813 A1 on May 3, 2018.

INCORPORATION BY REFERENCE

The content of co-pending UK patent applications GB2507622 and GB2499461 are hereby incorporated by reference. The content of U.S. Pat. No. 7,349,776 and co-pending international patent applications WO2013/124321 and WO2014/139875 are incorporated herein by reference. The content of UK patent applications GB2492748 and GB2499279 and UK patents GB2492655 and GB2508464 are also incorporated herein by reference.

TECHNICAL FIELD

The present disclosure relates to a vehicle controller and control method and particularly, but not exclusively, to a controller and a method for controlling operation of one or more vehicle systems or subsystems in a land-based vehicle capable of driving in a variety of different and extreme terrains and conditions. Aspects of the invention relate to a controller, to a control system, a vehicle, a method, a non-transitory computer readable carrier medium carrying a computer readable code, a computer program product executable on a processor, a computer readable medium and a processor.

BACKGROUND

It is known to provide a control system for a motor vehicle for controlling one or more vehicle subsystems. U.S. Pat. No. 7,349,776 discloses a vehicle control system comprising a plurality of subsystem controllers including an engine management system, a transmission controller, a steering controller, a brakes controller and a suspension controller. The subsystem controllers are each operable in a plurality of subsystem function or configuration modes. The subsystem controllers are connected to a vehicle mode controller which controls the subsystem controllers to assume a required function mode so as to provide a number of driving modes for the vehicle. Each of the driving modes corresponds to a particular driving condition or set of driving conditions, and in each mode each of the sub-systems is set to the function mode most appropriate to those conditions. Such conditions are linked to types of terrain over which the vehicle may be driven such as grass/gravel/snow, mud and ruts, rock crawl, sand and a highway mode known as 'special programs off' (SPO). The vehicle mode controller may be referred to as a Terrain Response (TR)® System or controller. The driving modes may also be referred to as terrain modes, terrain response modes, or control modes.

As noted above, for each of the driving modes each of the sub-systems is set to the function mode most appropriate to those conditions. The present applicant has recognised that the particular configuration of a subsystem in a given driving mode may not be optimum for the actual prevailing conditions, or a driver may have a particular preference for the manner in which one or more of the subsystems are configured in a given driving mode other than the default configuration corresponding to the driving mode. By way of example, it is to be understood that the Sand driving mode may not provide optimum vehicle performance when driving on wet or damp sand, compared with dry sand.

It is against this background that the present invention has been conceived. Embodiments of the invention may provide an apparatus, a method or a vehicle which addresses the above problems. Other aims and advantages of embodiments of the invention will become apparent from the following description, claims and drawings.

SUMMARY OF THE INVENTION

In one aspect of the invention for which protection is sought there is provided a control system for a motor vehicle configured to:
receive drive demand information indicative of an amount of drive demanded of a powertrain of the vehicle;
control an amount of drive torque applied by the powertrain to one or more road wheels in dependence at least in part on the drive demand information;
receive gradient information indicative of a gradient of a driving surface; and
receive speed information indicative of vehicle speed over ground,
the control system being configured automatically to cause a braking system to apply brake force to one or more of the road wheels to substantially prevent rollback of the vehicle in dependence at least in part on the gradient information and speed information, the control system being configured to adjust the amount of brake force applied in dependence at least in part on the drive demand information,
wherein the control system being configured to adjust the amount of brake force applied in dependence at least in part on the drive demand information comprises the control system being configured to cause the amount of brake force applied to increase progressively as the amount of drive demand decreases.

Embodiments of the present invention have the advantage that vehicle progress over terrain may be controlled by reference to drive demand information without a requirement separately to provide brake demand input to the system in addition.

It is to be understood that some embodiments of the present invention enable a driver to control the speed of travel of the vehicle as it negotiates rocky terrain in a convenient manner using the drive torque demand control without requiring the driver separately to control application of brake force by the braking system. Rather, the control system causes the braking system to be activated automatically in dependence on the amount of driver drive torque demand when an obstacle is encountered. Thus, a workload on the driver may be reduced, enabling the driver to focus more attention on steering the vehicle over the terrain.

Thus, if a vehicle is in the process of mounting a rock or boulder in a path of the vehicle, and the amount of powertrain drive torque applied to the one or more drive wheels decreases, the control system automatically increases the amount of brake force applied by the braking system.

It is to be understood that, in vehicles having four road wheels, each wheel is typically a brake wheel, to which brake force may be applied by a braking system, which may be a foundation braking system, for example a fluid powered braking system in which fluid actuated brake pads are brought into contact with brake disks as is known in the art. In some vehicles having four wheels, each wheel may be a drive wheel to which drive torque may be applied by a powertrain. Such vehicles are generally known as four wheel drive vehicles (known as a '4×4' configuration). Embodiments of the present invention are not restricted to four wheel drive vehicles, and embodiments of the present invention are also suitable for use in vehicles having a different number of road wheels and a different number of drive wheels such as two drive wheels, for example in a vehicle having four road wheels (known as a '4×2' configuration).

Optionally, the control system being configured to adjust the amount of brake force applied in dependence at least in part on the drive demand information comprises the control system being configured automatically and progressively to apply brake pressure as an accelerator pedal is released.

The control system may be configured automatically to cause the braking system to apply brake force to the one or more brake wheels to substantially prevent rollback of the vehicle if the vehicle speed falls substantially to zero, the gradient information indicates that the gradient of the driving surface exceeds a predetermined gradient amount, and the drive demand information indicates the amount of drive demanded of the powertrain is below a predetermined drive demand amount.

Optionally, the predetermined drive demand amount corresponds substantially to the minimum required amount of drive demand to prevent rollback of the vehicle on the instant driving surface, the predetermined drive demand amount being determined in dependence at least in part on the gradient information.

Optionally, the predetermined amount of driver drive demand is substantially zero driver drive demand. The control system may comprise a drive torque control device. The drive torque control device may be configured automatically to assume the baseline condition upon release of the drive demand input device by the driver. The drive torque control device may comprise biasing means, such as a resiliently extensible or compressible biasing element such as a spring element. The drive demand input device may comprise a conventional accelerator pedal input device, hand actuated twist-throttle input device, hand actuated lever device or any other suitable device. Substantially zero driver drive demand may be indicated when the drive demand input device is in the baseline condition.

Optionally, the control system being configured to adjust the amount of brake force applied in dependence at least in part on the drive demand information comprises the control system being configured to cause the amount of brake force applied to reduce progressively as the amount of drive demand increases.

Optionally, the control system being configured to adjust the amount of brake force applied in dependence at least in part on the drive demand information comprises the control system being configured to cause the amount of brake force applied to reduce progressively as the amount of drive demand increases, the amount of brake force being dependent at least in part of the gradient information and drive demand information.

Thus, in some embodiments the amount of brake force may reduce progressively as the amount of drive demand increases, and not in a substantially abrupt, step-like manner.

Optionally, the control system being configured to adjust the amount of brake force applied in dependence at least in part on the drive demand information further comprises the control system being configured to cause the amount of brake force applied to reduce progressively substantially to zero as the amount of drive demand increases, the amount of brake force being dependent at least in part on the gradient information and drive demand information.

Thus, in some embodiments the amount of brake force may reduce progressively to zero as the amount of drive demand increases. That is, when the amount of brake force is reduced, it is reduced in a relatively smooth, progressive manner and not in an abrupt, step-like manner. Thus, brake force is not reduced progressively to a predetermined value and then reduced to zero abruptly. It is to be understood that this does not preclude the amount of brake force reducing progressively to a non-zero value, remaining substantially constant for a period of time, and then reducing progressively to zero.

Optionally, the control system being configured to adjust the amount of brake force applied in dependence at least in part on the drive demand information comprises the control system being configured to cause a reduction in the amount of brake force applied as the amount of drive demand increases, the amount of brake force being dependent at least in part of the gradient information and drive demand information, the control system being configured to maintain a predetermined amount of applied brake force as the vehicle moves forward when the amount of drive demand is sufficiently high.

This feature has the advantage that, if a wheel of the vehicle is travelling over a rock or boulder, an amount of lurch of the vehicle, as the wheel crests the rock or boulder and the amount of drive torque required for continued movement reduces abruptly, may be substantially reduced.

It is to be understood that the predetermined amount of applied brake force maintained by the control system as the vehicle moves forward when the amount of drive demand is sufficiently high may subsequently be reduced progressively to substantially zero.

Optionally, the control system being configured to maintain a predetermined amount of applied brake force as the vehicle moves forward comprises the control system being configured to limit vehicle speed to a predetermined speed limit value.

Thus in some embodiments the predetermined amount of applied brake force may be the amount of brake force required to limit vehicle speed to the predetermined speed limit value.

The control system may comprise an electronic processor having an electrical input for receiving the drive demand information, gradient information and speed information; and an electronic memory device electrically coupled to the electronic processor and having instructions stored therein, wherein the processor is configured to access the memory device and execute the instructions stored therein such that it is operable to:

control an amount of drive torque applied by the powertrain to one or more road wheels in dependence at least in part on the drive demand information;

automatically cause a braking system to apply brake force to one or more of the road wheels to substantially prevent rollback of the vehicle in dependence at least in part on the gradient information and speed information; and adjust the amount of brake force applied in dependence at least in part on the drive demand information.

In an aspect of the invention for which protection is sought there is provided a vehicle comprising a control system according to any preceding claim.

In a further aspect of the invention for which protection is sought there is provided a method of controlling a vehicle implemented by means of a control system, the method comprising:

receiving drive demand information indicative of an amount of drive demanded of a powertrain of the vehicle;

controlling an amount of drive torque applied by the powertrain to one or more road wheels in dependence at least in part on the drive demand information;

receiving gradient information indicative of a gradient of a driving surface; and receiving speed information indicative of vehicle speed over ground, the method comprising automatically causing a braking system to apply brake force to one or more of the road wheels to substantially prevent rollback of the vehicle in dependence at least in part on the gradient information and speed information, and automatically adjusting the amount of brake force applied in dependence at least in part on the drive demand information, whereby automatically adjusting the amount of brake force applied in dependence at least in part on the drive demand information comprises causing the amount of brake force applied to increase progressively as the amount of drive demand decreases.

The method may comprise automatically causing the braking system to apply brake force to the one or more brake wheels to substantially prevent rollback of the vehicle if the vehicle speed falls substantially to zero, the gradient information indicates that the gradient of the driving surface exceeds a predetermined gradient amount, and the drive demand information indicates the amount of drive demanded of the powertrain is below a predetermined drive demand amount.

Optionally, the predetermined drive demand amount corresponds substantially to the minimum required amount of drive demand to prevent rollback of the vehicle on the instant driving surface, the method comprising determining the predetermined drive demand amount in dependence at least in part on the gradient information.

Optionally, adjusting the amount of brake force applied in dependence at least in part on the drive demand information comprises causing a reduction in the amount of brake force applied as the amount of drive demand increases.

Optionally, adjusting the amount of brake force applied in dependence at least in part on the drive demand information comprises causing an increase in the amount of brake force applied as the amount of drive demand decreases.

Optionally, adjusting the amount of brake force applied in dependence at least in part on the drive demand information comprises causing a reduction in the amount of brake force applied as the amount of drive demand increases, whereby the amount of brake force is dependent at least in part on the gradient information and drive demand information, the method comprising maintaining a predetermined amount of applied brake force as the vehicle moves forward when the amount of drive demand is sufficiently high.

Optionally, maintaining a predetermined amount of applied brake force as the vehicle moves forward comprises maintaining a sufficient amount of brake force to limit vehicle speed to a predetermined speed limit value.

The predetermined speed limit value may be a function of accelerator pedal position in some embodiments.

In an aspect of the invention for which protection is sought there is provided a non-transitory computer readable carrier medium carrying a computer readable code for controlling a vehicle to carry out the method of another aspect.

In an aspect of the invention for which protection is sought there is provided a computer program product executable on a processor so as to implement the method of another aspect.

In an aspect of the invention for which protection is sought there is provided a computer readable medium loaded with the computer program product of another aspect.

In an aspect of the invention for which protection is sought there is provided a processor arranged to implement the method of another aspect, or the computer program product of another aspect.

In one aspect of the invention for which protection is sought there is provided a motor vehicle having a control system that assists a driver driving a vehicle over rocky terrain by automatically controlling the application of a braking system of the vehicle to prevent (1) rollback if a driver releases an accelerator control such as an accelerator pedal whilst mounting a step-like obstacle such as a rock, and/or (2) forward lurch when the vehicle mounts the step-like obstacle. Thus, a driver is required substantially only to control an accelerator of the vehicle such as an accelerator pedal, and steer the vehicle in the case of a vehicle not configured automatically to steer. The feature of automatic brake control in this manner may be referred to as a 'creep mode', 'single pedal crawl mode' or other suitable title. The feature may be automatically triggered when one or more conditions are met, and/or selected automatically by a user when required. In the case of automatic triggering, in some embodiments the feature may be triggered in the event that the control system detects that the vehicle has stopped abruptly due to a wheel of the vehicle encountering an obstacle at low speed, in which case rollback of the vehicle may be substantially immediately countered by application of the braking system. For example, if the vehicle has stopped moving and the control system determines that the amount of powertrain torque being developed substantially at the moment the vehicle stops is sufficient to maintain progress over the terrain (by reference to the instant gradient of the driving surface, based on vehicle attitude) the control system may determine that a wheel of the vehicle has encountered a step-like obstacle requiring additional powertrain torque to negotiate. The control system may then automatically trigger the single pedal rock crawl mode. If the vehicle is travelling with the single pedal rock crawl mode selected and a step-like obstacle is detected, the control system may again automatically deploy the braking system to prevent rollback. The single pedal rock crawl mode may only be operable at a speed at or below a critical speed, such as 6 kph, 10 kph or any other suitable speed.

Some embodiments of the invention provide a control system for assisting a driver negotiate rocky terrain using a single pedal (accelerator pedal) to control engine torque and brake force. If the vehicle encounters an abrupt step such as a rock or boulder, the control system applies brake force to prevent rollback without a driver being required to depress the brake pedal. The driver then depresses the accelerator pedal and the control system releases the brake force gradually, as the amount of drive torque increases, allowing the vehicle to mount the step without rollback. Some brake force is maintained as the vehicle negotiates the step so that as the vehicle mounts the step the brake force prevents excessive forward lurch.

This has the advantage that less experienced drivers may negotiate rocky terrain with increased vehicle composure, the chances of excessive lurch being experienced being reduced.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

The present invention will now be described, by way of example only, with reference to the accompanying drawings, in which.

DETAILED DESCRIPTION

Figure 1:
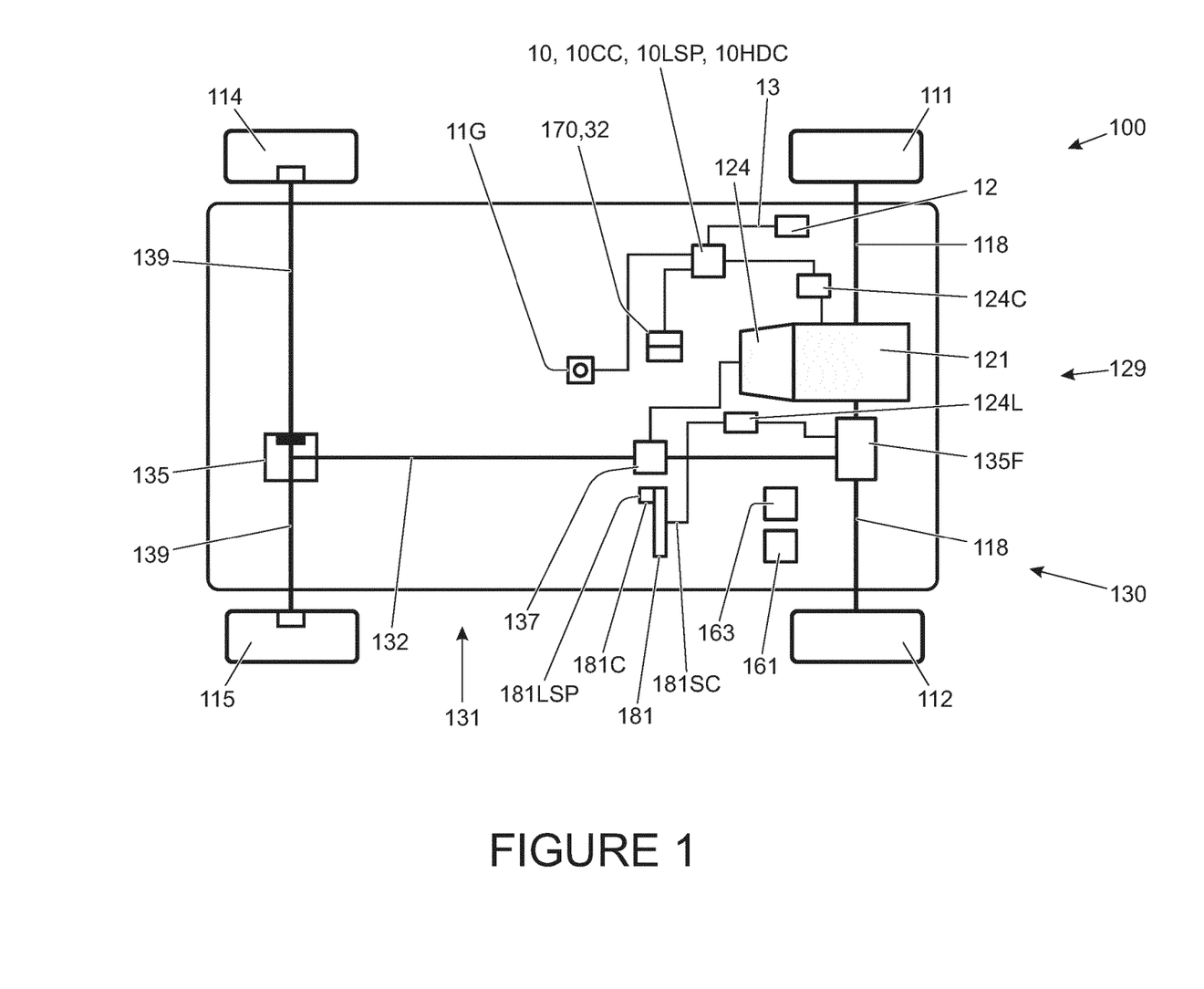
FIG. 1 is a schematic illustration of a vehicle according to an embodiment of the present invention.

FIG. 1 shows a vehicle 100 according to an embodiment of the invention intended to be suitable for off-road use, that is for use on terrains other than regular tarmac road, as well as on-road. The vehicle 100 has a powertrain 129 that includes an engine 121 that is connected to a driveline 130 having an automatic transmission 124 controlled by a transmission controller 124C. The transmission 124 has a transmission mode selector dial 124L permitting a driver to select the required transmission operating mode selected from park (P), forward drive (D), neutral (N) and reverse drive (R).

The driveline 130 is arranged to drive a pair of front vehicle wheels 111,112 by means of a front differential 135F and a pair of front drive shafts 118. The driveline 130 also comprises an auxiliary driveline portion 131 arranged to drive a pair of rear wheels 114, 115 by means of an auxiliary driveshaft or prop-shaft 132, a rear differential 135 and a pair of rear driveshafts 139. It is to be understood that embodiments of the present invention are suitable for use with vehicles in which the transmission 124 is arranged to drive only a pair of front wheels or only a pair of rear wheels (i.e. front wheel drive vehicles or rear wheel drive vehicles) or selectable two wheel drive/four wheel drive vehicles, or permanent four wheel drive vehicles. In the embodiment of FIG. 1 the transmission 124 is releasably connectable to the auxiliary driveline portion 131 by means of a transfer case 137, allowing selectable two wheel drive or four wheel drive operation. It is to be understood that embodiments of the invention may be suitable for vehicles having more than four wheels or less than four wheels.

In the present embodiment the transfer case 137 is operable in a 'high ratio' ('hi') or a 'low ratio' ('lo') configuration, in which a gear ratio between an input shaft and an output shaft thereof is selected to be a high or low ratio. The high ratio configuration is suitable for general on-road or 'on-highway' operations whilst the low ratio configuration is more suitable for negotiating certain off-road terrain conditions and other low speed applications such as towing. In some embodiments the transfer case 137 may be operable in only one gear ratio configuration rather than one of two ratio configurations.

The vehicle 100 has an accelerator pedal 161, a brake pedal 163 and a steering wheel 181. The steering wheel 181 is supported by a steering column 181SC. The steering wheel 181 has a cruise control selector button 181C mounted thereto for activating an on-highway cruise control system 10CC that is implemented in software by a vehicle central controller, referred to as a vehicle control unit (VCU) 10 described in more detail below. The steering wheel 181 is also provided with a low speed progress control system selector button 181LSP for selecting operation of a low speed progress (LSP) control system 10LSP which may also be referred to as an off-road speed control system or off-road cruise control system. The LSP control system 10LSP is also implemented in software by the VCU 10. In addition to the cruise control system 10CC and LSP control system 10LSP the VCU 10 is configured to implement a hill descent control (HDC) system 10HDC that limits maximum vehicle speed when descending an incline by automatic application of a brakes (or braking) system 12d (FIG. 2) described in more detail below. The HDC system 10HDC may be activated via human machine interface (HMI) module 32.

The VCU 10 receives a plurality of signals from various sensors and subsystems 12 provided on the vehicle 100.

Figure 2:
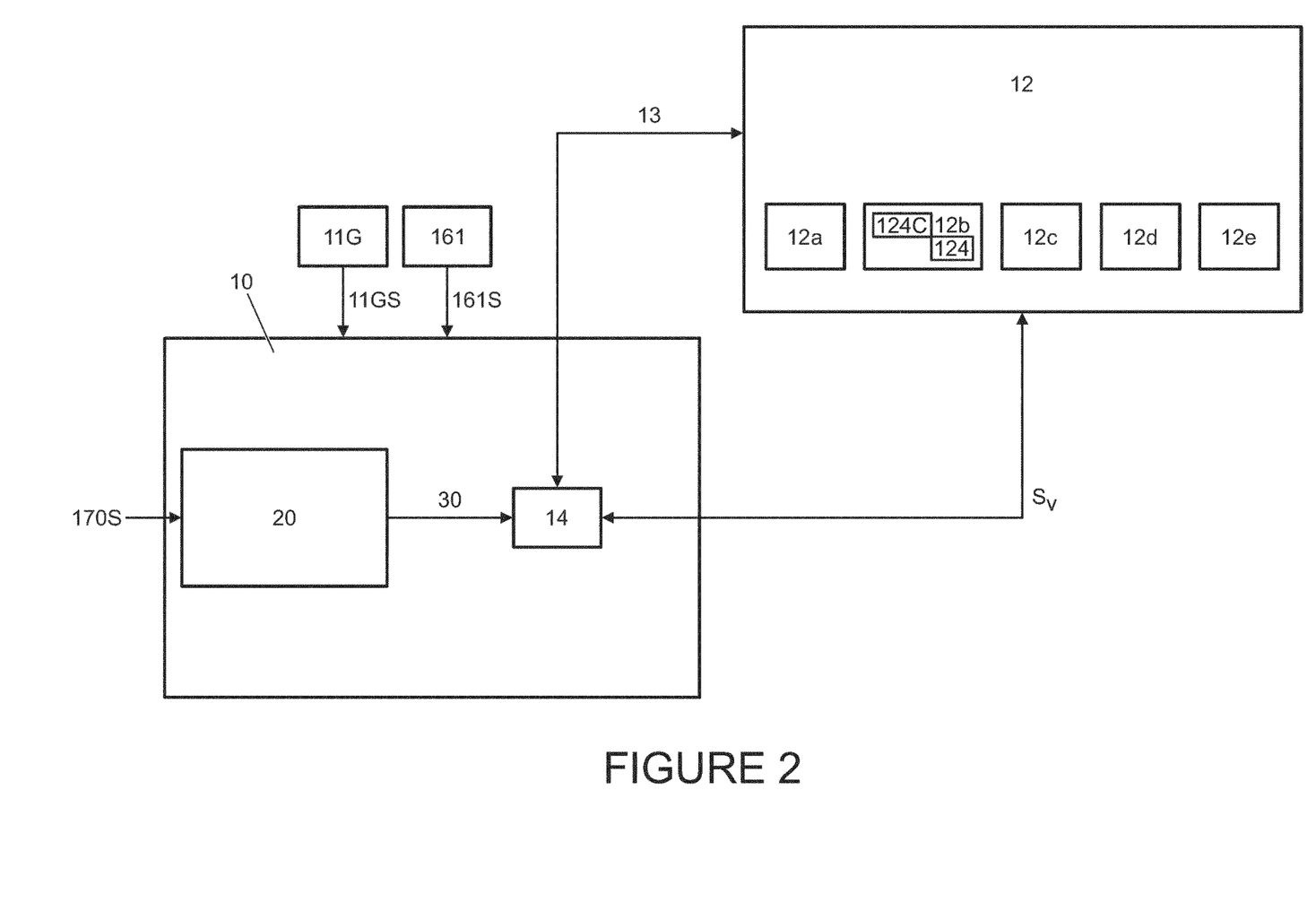
FIG. 2 is a block diagram to illustrate a vehicle control system in accordance with an embodiment of the invention, including various vehicle subsystems under the control of the vehicle control system.

FIG. 2 is a schematic diagram illustrating operation of the VCU 10 in more detail. The VCU 10 controls a plurality of vehicle subsystems 12 including, but not limited to, an engine management system 12a, a transmission system 12b that includes the transmission 124 and transmission controller 124C, an electronic power assisted steering unit 12c (ePAS unit), the brakes system 12d and a suspension system 12e. These vehicle sub-systems can be considered to form a first group of subsystems. Although five subsystems are illustrated as being under the control of the VCU 10, in practice a greater number of vehicle subsystems may be included on the vehicle and may be under the control of the VCU 10. The VCU 10 includes a subsystem control module 14 which provides control signals via line 13 to each of the vehicle subsystems 12 to initiate control of the subsystems in a manner appropriate to the driving condition, such as the terrain, in which the vehicle is travelling (referred to as the terrain condition). The subsystems 12 also communicate with the subsystems control module 14 via signal line 13 to feedback information on subsystem status. In some embodiments, instead of an ePAS unit 12c, a hydraulically operated power steering unit may be provided.

The vehicle is configured to be caused to operate, by the VCU 10, in one of a plurality of predetermined control modes in dependence on the mode selected by the driver. For this purpose a driving mode selector in the form of a rotary dial is provided as part of switchpack 170. In each control mode, the subsystems 12 are caused to operate in a predetermined subsystem configuration mode suitable for a given terrain type. The control modes include a grass/gravel/snow control mode (GGS mode) that is suitable for when the vehicle is travelling in grass, gravel or snow terrain, a mud/ruts control mode (MR mode) which is suitable for when the vehicle is travelling in mud and ruts terrain, a rock crawl/boulder mode (RC mode) which is suitable for when the vehicle is travelling in rock or boulder terrain, a sand mode which is suitable for when the vehicle is travelling in sand terrain (or deep soft snow) and a special programs OFF mode (SP OFF mode or SPO mode, also referred to as a Highway or 'on-highway' mode) which is a suitable compromise mode, or general mode, for all terrain conditions and especially vehicle travel on motorways and regular roadways. Many other control modes are also envisaged including those disclosed in US2003/0200016, the content of which is hereby incorporated by reference.

The different terrain types are grouped according to the friction of the terrain and the roughness of the terrain. For example, it is appropriate to group grass, gravel and snow together as terrains that provide a low friction, smooth surface and it is appropriate to group rock and boulder terrains together as high friction, very high roughness terrains.

In some embodiments the VCU 10 may be configured automatically to determine the most appropriate driving mode under a given set of driving conditions. An example of the manner in which this may be accomplished is explained in more detail in UK patent GB2492655 to the present applicant, the content of which is incorporated herein by reference as noted above.

In the present embodiment, the user determines in which subsystem control mode the subsystems will be operated by selection of a required system control mode (operating mode). The HMI module 32 comprises a display screen (not shown) and a user operable switchpack 170. The switchpack 170 allows the user to select the desired subsystem control mode. A selector module 20 of the VCU 10 receives a signal 170S from the switchpack 170 as shown in FIG. 2 indicative of the selected control mode. The selector mode communicates the selected control mode to the subsystem controller 14 via the subsystem signal line 30.

It is to be understood that the subsystem controller 14 may itself control the vehicle subsystems 12a-12e directly via the signal line 13, or alternatively each subsystem may be provided with its own associated intermediate controller (not shown in FIG. 2) for providing control of the relevant subsystem 12a-12e. In the latter case the subsystem controller 14 may only output the identity of the selected subsystem control mode to each subsystem 12a-12e, 12e, rather than implementing the actual control steps for the subsystems. The or each intermediate controller may in practice form an integral part of the main subsystem controller 14.

In the present embodiment, if the user selects the RC mode the VCU 10 is configured to allow a driver to control application of drive torque and brake torque to the wheels 111, 112, 114, 115 of the vehicle 100 by means of a single input control, in the present embodiment the accelerator pedal 161, in order to cause the vehicle 100 to crawl over an obstacle presenting a relatively abrupt gradient increase, such as a boulder.

It will be understood that the system of the invention is embodied, in the example given, in the VCU 10, however it will be understood that the system is not limited to being contained in a single processor or controller and the various functions may be distributed amongst two or more controllers. It will be understood that the processor has a memory associated therewith which contains readable code that is enacted in order for the controller to carry out the method of the invention. In order to effect this single pedal crawl feature, the VCU 10 monitors the gradient of the driving surface over which the vehicle 100 is travelling by reference to speed information in the form of a vehicle reference speed signal Sv received from a brake controller forming part of the braking system 12d, a signal indicative of gradient information, referred to as a gradient signal, 11GS received from a gradient sensor 11G, and an accelerator pedal signal 161S indicative of the position of the accelerator pedal relative to a range of allowable travel thereof. The accelerator pedal signal 161S is a measure of drive demand information.

Figure 3:
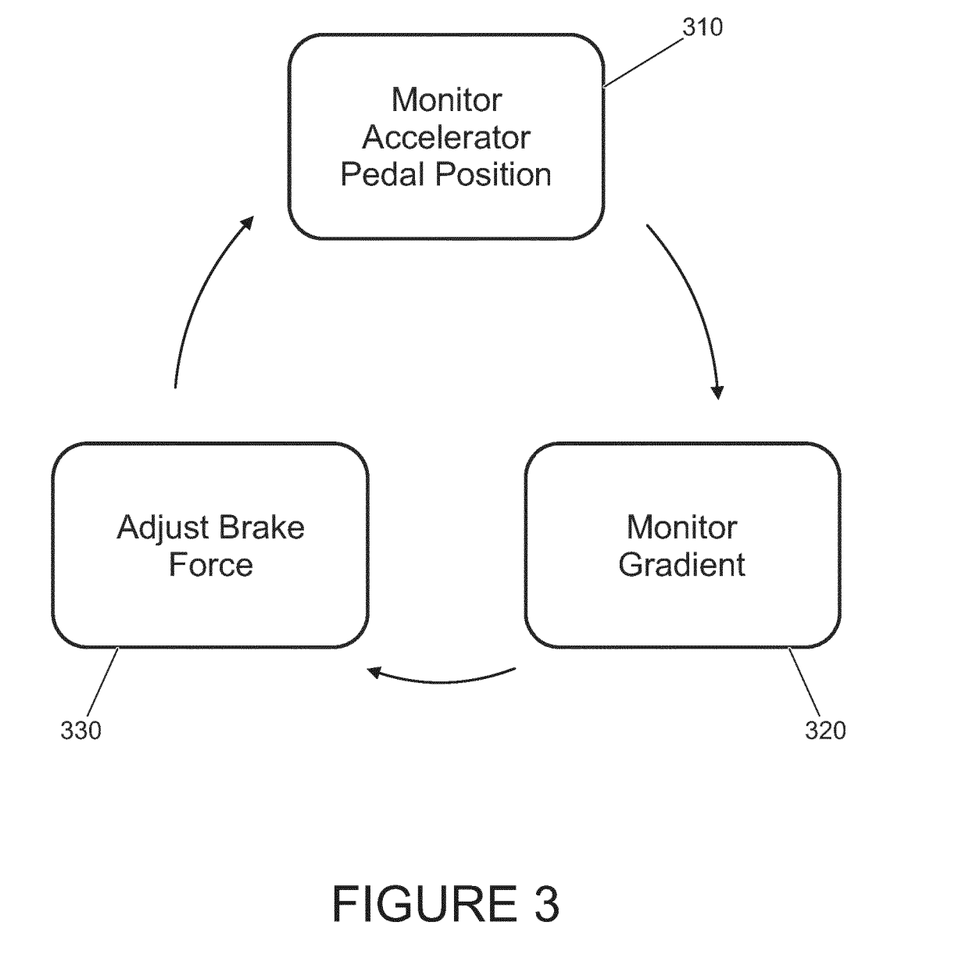
FIG. 3 is a flow diagram illustrating a control loop for controlling the vehicle of the embodiment of FIG. 1.
Figure 4:
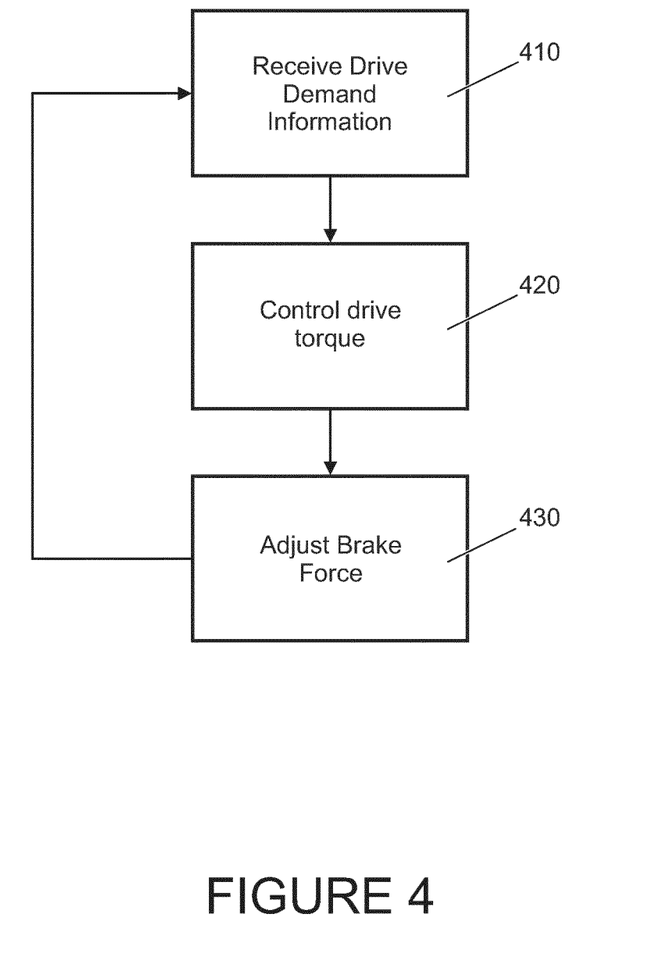
FIG. 4 is a flow diagram illustrating a portion of a method of controlling the vehicle of the embodiment of FIG. 1.

With respect to FIGS. 3 and 4, a simplified version of the method carried out by the VCU 10 is shown.

Referring now to FIG. 3, the VCU 10 monitors the accelerator pedal position 310, which is indicative of the amount of drive torque requested of the powertrain of the vehicle by the driver. The VCU 10 also continues to monitor the gradient 320 of the surface over which the vehicle 100 is travelling, and adjust the brake force 330 applied by the braking system 12d to ensure that the vehicle 100 does not rollback against the direction of travel. The VCU 10 continues to iteratively loop these steps, whilst the single pedal crawl feature is activated, to ensure that the vehicle does not rollback.

Referring to FIG. 4, the VCU 10 receives drive demand information 410, such as from the accelerator pedal position 310, and is operable to control the drive torque 420 applied to the wheels of the vehicle 100. The VCU 10 then adjusts the brake force 430 applied to the wheels of the vehicle 100 to ensure that forward progress can be made, whilst still substantially preventing rollback of the vehicle 100. The VCU 10 continues to iteratively loop these steps, whilst the single pedal crawl feature is activated, to ensure that the vehicle does not rollback.

The methods as described in FIGS. 3 and 4 will continue to work at the same time, ensuring that forward progress can be made as requested by the user of the vehicle, whilst rollback of the vehicle is substantially prevented.

Figure 5:
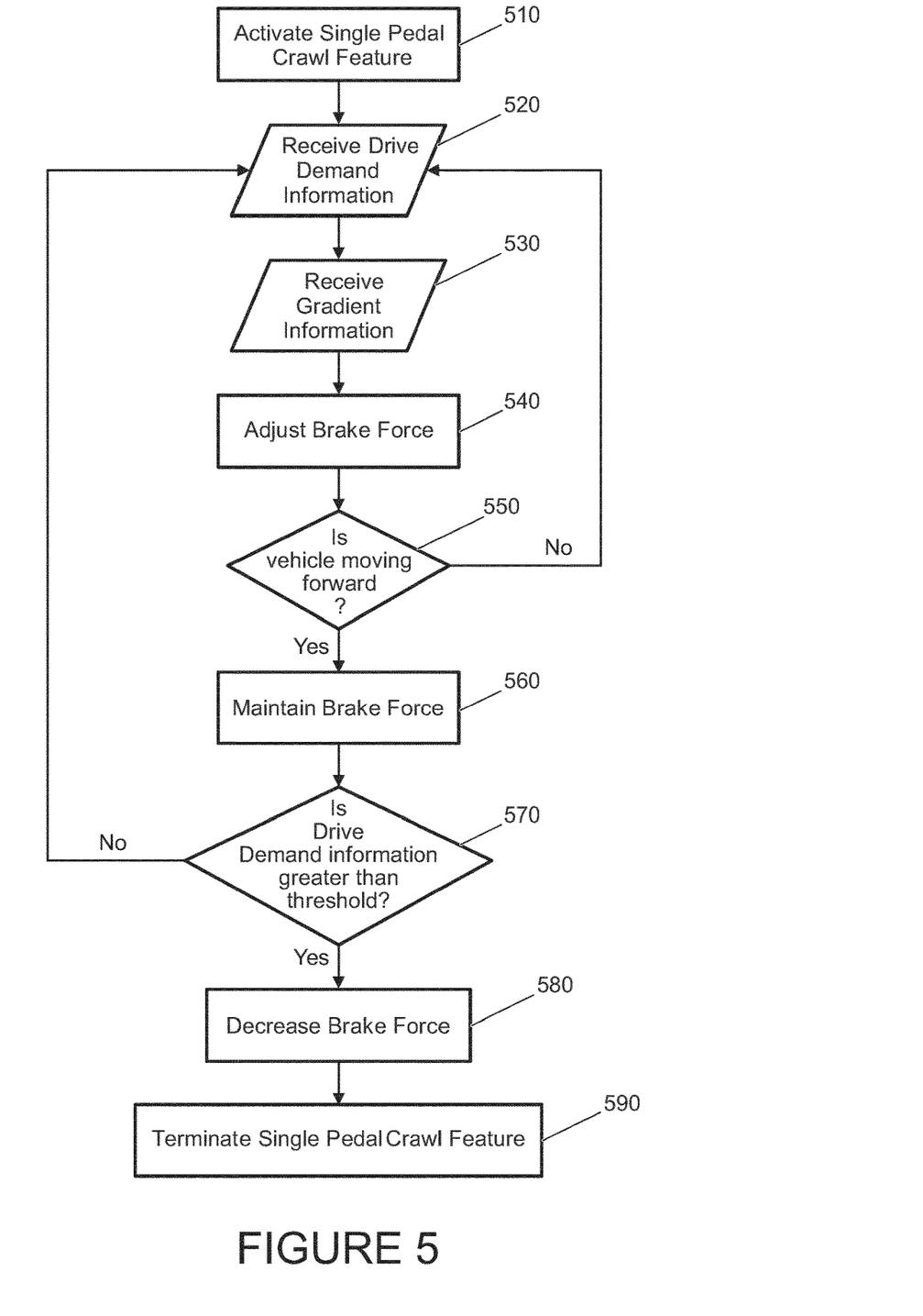
FIG. 5 is a flow diagram illustrating a method of controlling the vehicle of the embodiment of FIG. 1.

FIG. 5 is a flow diagram illustrating operation of the vehicle 100 of an embodiment of FIG. 1.

At step 510 the vehicle 100 is operating with the single pedal crawl feature activated by a driver. It is to be understood that the single pedal crawl feature may also be referred to as a 'creep mode'. The transmission 124 is in the forward driving mode D.

At step 520, drive demand information is received by the VCU 10 from the driver by way of an accelerator pedal input, derived from the accelerator pedal position 310. The drive demand information is analogous to an amount of drive demanded of the powertrain of the vehicle by the driver.

At step 530, gradient information is received by the VCU 10, as indicated by the gradient signal 11GS. The gradient information is representative of the gradient of the terrain that the vehicle 100 is currently traversing.

At step 540, the amount of brake force applied to the one or more wheels or one or more axles of the vehicle by the braking system of the vehicle 100 is adjusted in dependence on the drive demand information received at step 520 and the gradient information received at step 530. The amount of brake force is determined to substantially prevent rollback of the vehicle, that is, movement of the vehicle in a direction opposite to that which the driver has selected via the transmission.

At step 550, the VCU determines whether the vehicle is moving forward. If the vehicle is not moving forward, the process reverts to step 520. If the vehicle is moving forward, the process moves to step 560.

At step 560, the brake force applied to the one or more wheels or the one or more axles of the vehicle 100 is maintained at substantially the same level to ensure continued forward progress of the vehicle.

At step 570, the drive demand information is compared with a threshold value to determine if the driver of the vehicle is requesting an increase in the speed of the vehicle, via the accelerator pedal input. If the drive demand information is not greater than the threshold value, the process reverts to step 520 and the process continues to loop. If the drive demand information is greater than the threshold value, the process continues to step 580.

At step 580, the brake force applied to the one or more wheels or the one or more axles of the vehicle 100 is reduced substantially to zero, to allow the forward motion of the vehicle 100 to continue and the speed to increase, as requested by the driver via the accelerator pedal input.

At step 590, the single pedal crawl feature is automatically deactivated, as the drive of the vehicle has requested that the speed of the vehicle increases above the threshold, and as such rollback of the vehicle is no longer a likely outcome.

If the VCU 10 determines that the vehicle 100 has come to rest due to the presence of an obstacle in a path of travel of the vehicle 100 presenting a relatively abrupt gradient increase, the VCU 10 automatically activates the single pedal crawl feature. Alternatively, the single pedal crawl feature may be activated (step 510) by a driver, by selecting the feature from a menu that is selectable by means of HMI module 32. In some embodiments the single pedal crawl feature may be activated by a driver only when the vehicle is substantially stationary.

It is to be understood that, when the single pedal crawl feature is activated (step 510), the vehicle 100 is configured automatically to cause application of brake force to the wheels 111, 112, 114, 115 of the vehicle 100 in order to prevent rollback of the vehicle 100 against the direction of travel. It is to be understood that in the present embodiment the direction of travel is determined by reference to the selected transmission mode. Thus if the transmission 124 is in a mode corresponding to forward travel, such as the D mode, rollback is considered to be travel in a direction opposite the forward direction of travel when in the D mode.

The VCU 10 is configured to determine that the vehicle 100 has come to rest due to the presence of an obstacle in the path of travel if the vehicle 100 comes to rest (determined by reference to speed signal Sv) with the accelerator pedal 161 at a position (step 520) for which forward movement of the vehicle 100 would be expected for the prevailing driving surface gradient (see step 530, determined by reference to gradient signal 11GS). Thus, the VCU 10 determines that the amount of powertrain torque being developed by the powertrain 129 is insufficient to enable the vehicle 100 to make progress over the terrain, and causes application of brake force to prevent rollback (step 540). In the present embodiment the VCU 10 determines a minimum amount of drive demand (step 520) required to cause the vehicle 100 to make progress over the terrain, based on the prevailing driving surface gradient (step 530), this minimum amount of drive demand being referred to as a predetermined drive demand amount. If the amount of powertrain torque being developed is less than this predetermined drive demand amount then the VCU 10 causes the application of brake force to prevent rollback (540).

In the present embodiment the VCU 10 is configured to cause the braking system 12d to develop an amount of brake pressure P1 that is dependent on the gradient of the driving surface as determined by the VCU 10 when the vehicle 100 comes to rest. It is to be understood that the value of P1 is arranged to be higher for higher values of gradient as indicated by the gradient signal 11GS.

With the braking system 12d applied, the VCU 10 monitors the accelerator pedal position 161, by reference to accelerator pedal position signal 161S (step 520). As the amount of powertrain torque demanded by the driver increases (as determined by reference to pedal position signal 161S) the VCU 10 causes a progressive decrease in the amount of brake force applied by the braking system 12d (by causing a reduction in brake fluid pressure), whilst ensuring that sufficient brake force is maintained to prevent rollback of the vehicle 100 (step 540). The VCU 10 is configured to allow the brake pressure to reduce from the first predetermined pressure value P1 to a second predetermined pressure value P2 that is also dependent on the gradient of the driving surface as determined by reference to the prevailing value of gradient signal 11GS (step 530). When the powertrain torque is sufficient to overcome the brake force with the brake pressure substantially at value P2 the vehicle 100 will begin to mount the obstacle. The value of P2 is arranged to be a value that is sufficiently low to allow the vehicle powertrain 129 to cause the vehicle 100 to mount the obstacle, but sufficiently high to prevent the vehicle 100 surging forward once the obstacle has been mounted.

It is to be understood that, if the driver reduces the amount of demanded torque, by releasing the accelerator pedal 161 (step 570), the VCU 10 is configured to progressively increase the amount of brake pressure back towards a value P1 that is repeatedly calculated in dependence on the value of gradient indicated by gradient signal 11GS, preventing rollback (step 540). It is to be understood that the feature that the VCU 10 automatically causes application of brake force when the accelerator pedal 161 is released has the advantage that a workload imposed on the driver when negotiating an obstacle is reduced.

As noted above, it is to be understood that the VCU 10 is configured such that the second predetermined pressure value P2 is determined to be of a value sufficient to reduce forward lurch when the vehicle 100 mounts the object and continues to move forward, whilst permitting forward movement of the vehicle 100 (step 550) without requiring excessive additional powertrain torque to overcome the brake force imposed by the braking system 12d. It is to be understood that maintaining the application of brake force whilst mounting an obstacle, reducing forward lurch, has the advantage of enhancing vehicle composure when negotiating obstacles in the path of the vehicle 100. It is to be understood that the predetermined brake pressure values P1, P2 may be considered to have corresponding predetermined brake force amounts, being the amounts of brake force generated by those brake pressure values.

In the present embodiment, the VCU 10 is configured to monitor vehicle speed and to attempt to limit vehicle speed to a predetermined speed limit value, the predetermined speed limit value being a function of accelerator pedal position. If an increase in vehicle speed is observed as a consequence of a decrease in resistance to forward movement, the VCU 10 causes an increase in brake force applied by the braking system 12*d*, as required, in order to maintain vehicle speed substantially equal to the predetermined speed limit value for the prevailing accelerator pedal position.

However, if the driver depresses the accelerator pedal 161 by an amount sufficient to cause the vehicle 100 to accelerate such that vehicle speed increases above a predetermined maximum speed value when the single pedal crawl feature is in operation (step 570), the VCU 10 is configured to de-activate the single pedal crawl feature (step 590). In the present embodiment the predetermined maximum speed value is 6 kph although other values may be useful in some embodiments.

When the VCU 10 deactivates the single pedal crawl feature, the VCU 10 causes a gradual reduction in brake pressure in the braking system 12*d* to a value corresponding to the instant position of the brake pedal 163 (step 580).

It is to be understood that, whether or not the single pedal crawl feature is active, the braking system 12*d* remains responsive to depression of the brake pedal 163 in the usual manner.

Figure 6:
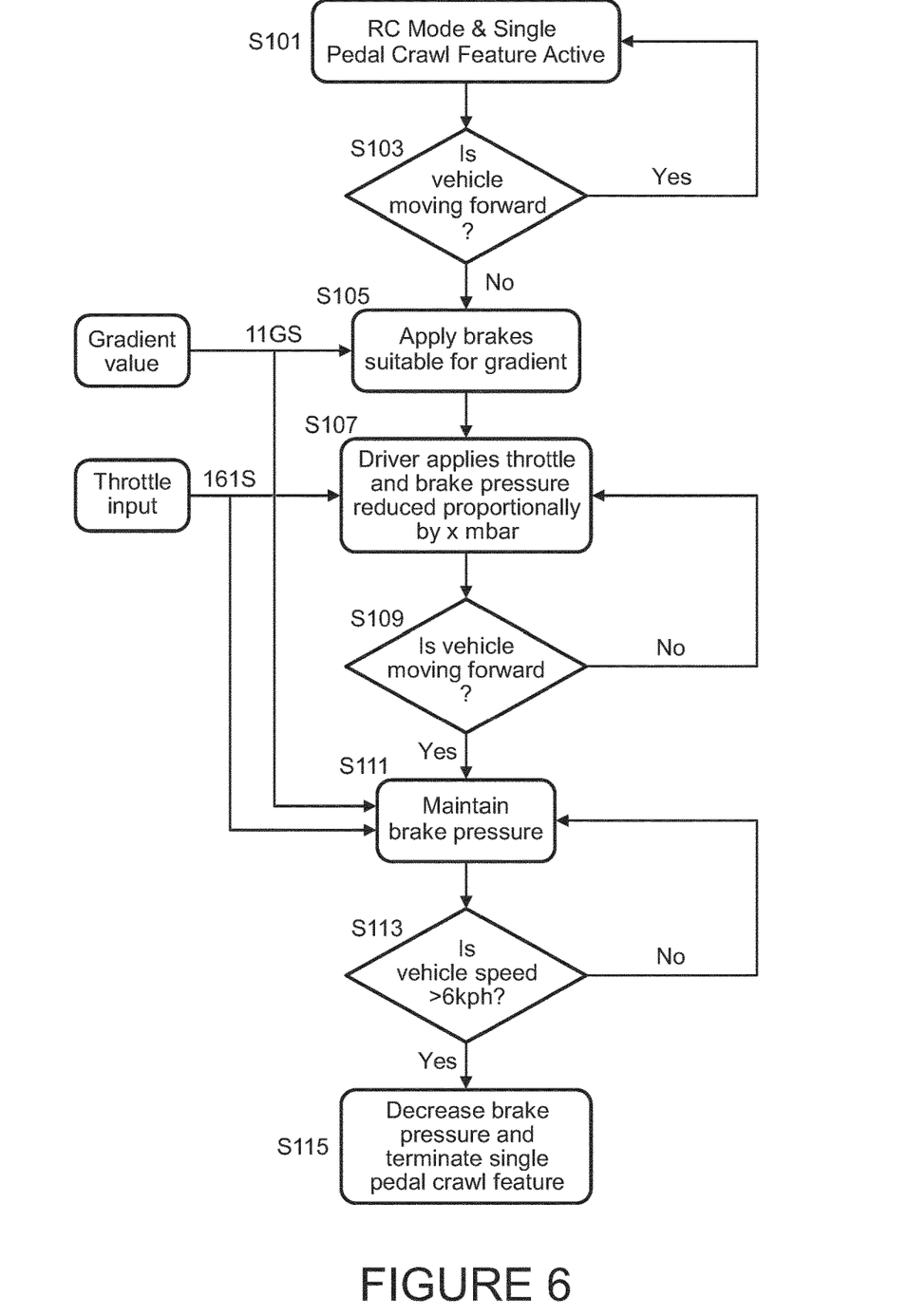
FIG. 6 is a flow diagram illustrating a further method of controlling the vehicle of the embodiment of FIG. 1.

FIG. 6 is a flow diagram illustrating operation of the vehicle 100 of the embodiment of FIG. 1.

At step S101 the vehicle 100 is operating with the VCU 10 in the RC driving mode with the single pedal crawl feature activated by a driver 510. It is to be understood that the single pedal crawl feature may also be referred to as a 'creep mode'. The transmission 124 is in the forward driving mode D.

At step S103 the VCU 10 checks that the vehicle 100 is moving in the direction corresponding to the selected transmission mode, in the present example the forward direction since the forward driving transmission mode D is selected. If at step S103 it is determined that the vehicle is moving forward the VCU 10 continues at step S101 else the VCU 10 continues at step S105.

At step S105 the VCU 10 applies the braking system 540, 12*d* by causing the pressure of brake fluid in the braking system 12*d* to reach a first pressure value P1. The value of P1 is calculated based on the gradient of the driving surface 530, determined by reference to gradient signal 11GS.

At step S107 the VCU 10 checks the position of accelerator (throttle) pedal 161 by reference to accelerator pedal position signal 161S, 520. As the amount of powertrain torque demanded by the driver increases 520, with increasing depression of the accelerator pedal 161, the VCU 10 decreases the amount of brake pressure P, 540 applied by the braking system 12*d* to a second pressure value P2 that is calculated in dependence on the gradient signal 11GS and accelerator pedal position signal 161S.

At step S109 the VCU 10 determines whether the vehicle 100 is moving forward 550 by reference to vehicle speed signal Sv. If the vehicle 100 is not moving forward the VCU 10 continues at step 520, S107. If the vehicle 100 is moving forward the VCU 10 continues at step 560, S111.

At step S111 the VCU 10 causes continued application of brake pressure 560 by the braking system 12*d* at a value P2 determined according to the gradient signal 11GS and accelerator pedal position signal 161S. The value of P2 is determined by the VCU 10 by reference to a database providing values of P2 as a function of gradient signal 11GS and accelerator pedal position signal 161S. It is to be understood that in the present embodiment the database is populated with values determined empirically during a calibration procedure, which may be conducted for example by means of field tests.

At step S113 the VCU 10 checks whether the vehicle speed (as indicated by speed signal Sv) exceeds a predetermined value. In the present embodiment, as noted above, the predetermined value is substantially 6 kph although other values may be useful in some alternative embodiments. If the vehicle speed does not exceed 6 kph the VCU 10 continues at step S111. If the vehicle speed does exceed 6 kph the VCU 10 continues at step S115.

At step S115 the VCU 10 prepares to terminate the single pedal crawl feature 590 and commands a gradual decrease in brake pressure to a value corresponding to the instant position of the brake pedal 163. In the case that the brake pedal 163 is not depressed, the VCU 10 causes a gradual ramp down in brake pressure to a value corresponding to a baseline brake pressure 580, which in some embodiments is a value substantially equal to atmospheric pressure. Once the brake pressure has been reduced to the value corresponding to the instant position of the brake pedal 163, the single pedal crawl feature is terminated automatically by the VCU 10.

It is to be understood that, when the single pedal crawl feature is in operation 510 and the VCU 10 commands a decrease or an increase in brake pressure 540, the rate of decrease and/or the rate of increase may be dependent at least in part on the gradient of the driving surface 530. It is particularly advantageous in some embodiments for the rate of increase in brake pressure to increase with increasing gradient, due to the increased force of gravity acting to cause rollback of the vehicle 100. Thus, in the event that the vehicle 100 is in the RC driving mode with the single pedal crawl feature inactive and the vehicle 100 encounters an obstacle that causes the vehicle 100 to stop, or in the event that the accelerator pedal 161 is released when the single pedal crawl feature is active, the rate of application of brake force to prevent rollback may be caused to increase with increasing gradient as determined by reference to the gradient signal 11GS.

It is to be understood that the brake force requested by the user of the vehicle through the position of the brake pedal or applied automatically by the system in response to the position of the accelerator pedal may be applied to the brake wheel by means of application of braking torque by an electric motor, optionally in the form of regenerative braking, in place of or in combination with the foundation braking system of the vehicle.

It is to be understood that where brake pressure is discussed, the braking system could apply a brake force by way of negative torque through an electric motor or similar, to give an equivalent force to the quoted brake pressure or brake pressure value at the applicable wheel or axle. Such a brake force may be applied by one or more electric motors, one or more elements of the foundation braking system, or some combination of both by methods such as brake blending.

Vehicles comprising one or more electric motors in combination with an internal combustion engine are known as hybrid electric vehicles or HEVs. Plug-in hybrid electric vehicles, or PHEVs, are a subset of HEVs and have the capability of having energy storage means charged by mains electricity, and as such generally have a larger capacity energy storage means. Battery electric vehicles, or BEVs, comprise one or more electric motors, but do not comprise an internal combustion engine, so must be charged by mains electricity. Each of the one or more electric motors may be associated with an individual wheel or axle of the vehicle. It will be appreciated that the amount of drive demanded of the powertrain as defined by the position of the accelerator pedal in such HEVs, PHEVs, or BEVs will be delivered to one or more of the wheels or one or more axles of the vehicle by the one or more electric motors, the internal combustion engine or a combination of both.

It will be understood that the embodiments described above are given by way of example only and are not intended to limit the invention, the scope of which is defined in the appended claims.

Throughout the description and claims of this specification, the words "comprise" and "contain" and variations of the words, for example "comprising" and "comprises", means "including but not limited to", and is not intended to (and does not) exclude other moieties, additives, components, integers or steps.

Throughout the description and claims of this specification, the singular encompasses the plural unless the context otherwise requires. In particular, where the indefinite article is used, the specification is to be understood as contemplating plurality as well as singularity, unless the context requires otherwise.

Features, integers, characteristics, compounds, chemical moieties or groups described in conjunction with a particular aspect, embodiment or example of the invention are to be understood to be applicable to any other aspect, embodiment or example described herein unless incompatible therewith.

The reader's attention is directed to all papers and documents which are filed concurrently with or previous to this specification in connection with this application and which are open to public inspection with this specification, and the contents of all such papers and documents are incorporated herein by reference.

The invention claimed is:

1. A control system for a motor vehicle, the control system comprising at least one controller configured to:
   receive drive demand information indicative of an amount of drive demanded of a powertrain of the vehicle;
   control an amount of drive torque applied by the powertrain to one or more road wheels in dependence at least in part on the drive demand information;
   receive gradient information indicative of a gradient of a driving surface;
   receive speed information indicative of vehicle speed over ground;
   determine that the vehicle has come to rest due to the presence of an obstacle in a path of travel of the vehicle, and automatically activate a single pedal crawl feature in response to such determination;
   when the single pedal rock crawl feature is active, automatically cause a braking system to apply brake force to one or more of the road wheels to substantially prevent rollback of the vehicle in dependence at least in part on the gradient information and speed information;
   adjust an amount of brake force applied in dependence at least in part on the drive demand information by automatically and progressively applying brake force as an accelerator pedal is released, wherein, when the single pedal rock crawl feature is active, both drive torque and brake torque are controlled by a driver using the accelerator pedal alone to ensure that forward progress of the vehicle can be made while substantially preventing rollback; and
   terminate the single pedal rock crawl feature in response to the vehicle speed exceeding a predetermined value.

2. The control system according to claim 1, further configured automatically to cause the braking system to apply brake force to the one or more of the road wheels to substantially prevent rollback of the vehicle if the vehicle speed falls substantially to zero, the gradient information indicates that the gradient of the driving surface exceeds a predetermined gradient amount, and the drive demand information indicates the amount of drive demanded of the powertrain is below a predetermined drive demand amount.

3. The control system according to claim 2, wherein the predetermined drive demand amount corresponds substantially to a minimum required amount of drive demand to prevent rollback of the vehicle on an instant driving surface, the predetermined drive demand amount being determined in dependence at least in part on the gradient information.

4. The control system according to claim 1, wherein the control system adjusts the amount of brake force applied in dependence at least in part on the drive demand information by causing the amount of brake force applied to reduce progressively as the amount of drive demand increases.

5. The control system according to claim 1, wherein the control system adjusts the amount of brake force applied in dependence at least in part on the drive demand information by causing the amount of brake force applied to reduce progressively as the amount of drive demand increases, the amount of brake force being dependent at least in part on the gradient information and drive demand information.

6. The control system according to claim 5, wherein the control system adjusts the amount of brake force applied in dependence at least in part on the drive demand information by causing the amount of brake force applied to reduce progressively substantially to zero as the amount of drive demand increases, the amount of brake force being dependent at least in part on the gradient information and drive demand information.

7. The control system according to claim 5, wherein the control system adjusts the amount of brake force applied in dependence at least in part on the drive demand information by causing the amount of brake force applied to reduce progressively as the amount of drive demand increases, and wherein the control system is configured to maintain a predetermined amount of applied brake force as the vehicle moves forward when the amount of drive demand is sufficiently high.

8. The control system according to claim 7, wherein the control system maintains a predetermined amount of applied brake force as the vehicle moves forward by limiting vehicle speed to a predetermined speed limit value.

9. The control system according to claim 1, further comprising an electronic processor having an electrical input for receiving the drive demand information, gradient information and speed information, and an electronic memory device electrically coupled to the electronic processor and having instructions stored therein,
   wherein the processor is configured to access the memory device and execute the instructions stored therein such that it is operable to:
   control an amount of drive torque applied by the powertrain to one or more road wheels in dependence at least in part on the drive demand information;
   automatically cause the braking system to apply brake force to the one or more of the road wheels to substantially prevent rollback of the vehicle in dependence at least in part on the gradient information and speed information; and
   adjust the amount of brake force applied in dependence at least in part on the drive demand information.

10. The control system according to any claim 1, wherein the braking system comprises a foundation braking system.

11. The control system according to claim 1, wherein the braking system comprises an electric motor.

12. A vehicle comprising the control system according to claim 1.

13. The control system of claim 1, wherein the control system is configured to determine, when the vehicle has stopped moving and the amount of powertrain torque being developed substantially at the moment the vehicle stops is sufficient to maintain progress over the terrain based on the instant gradient of the driving surface, that a wheel of the vehicle has encountered a step-like obstacle requiring the single pedal rock crawl feature.

14. A method of controlling a vehicle implemented by a control system, the method comprising:
   receiving drive demand information indicative of an amount of drive demanded of a powertrain of the vehicle;
   controlling an amount of drive torque applied by the powertrain to one or more road wheels in dependence at least in part on the drive demand information;
   receiving gradient information indicative of a gradient of a driving surface;
   receiving speed information indicative of vehicle speed over ground;
   determining that the vehicle has come to rest due to the presence of an obstacle in a path of travel of the vehicle, and automatically activating a single pedal crawl feature in response to such determination;
   when the single pedal rock crawl feature is active, automatically causing a braking system to apply brake force to the one or more of the road wheels to substantially prevent rollback of the vehicle in dependence at least in part on the gradient information and speed information; and
   automatically adjusting an amount of brake force applied in dependence at least in part on the drive demand information, whereby automatically adjusting the amount of brake force applied in dependence at least in part on the drive demand information comprises causing the amount of brake force applied to increase automatically and progressively as an accelerator pedal is released, wherein, when the single pedal rock crawl feature is active, both drive torque and brake torque are controlled by a driver using the accelerator pedal alone to ensure that forward progress of the vehicle can be made while substantially preventing rollback; and
   terminating the single pedal rock crawl feature in response to the vehicle speed exceeding a predetermined value.

15. The method according to claim 14, further comprising automatically causing the braking system to apply brake force to the one or more of the road wheels to substantially prevent rollback of the vehicle if the vehicle speed falls substantially to zero, the gradient information indicates that the gradient of the driving surface exceeds a predetermined gradient amount, and the drive demand information indicates the amount of drive demanded of the powertrain is below a predetermined drive demand amount.

16. The method according to claim 15, wherein the predetermined drive demand amount corresponds substantially to a minimum required amount of drive demand to prevent rollback of the vehicle on an instant driving surface, and wherein the method further comprises determining the predetermined drive demand amount in dependence at least in part on the gradient information.

17. The method according to claim 14, whereby adjusting the amount of brake force applied in dependence at least in part on the drive demand information comprises causing a reduction in the amount of brake force applied as the amount of drive demand increases.

18. The method according to claim 14, whereby adjusting the amount of brake force applied in dependence at least in part on the drive demand information comprises causing a reduction in the amount of brake force applied as the amount of drive demand increases, whereby the amount of brake force is dependent at least in part on the gradient information and drive demand information, the method comprising maintaining a predetermined amount of applied brake force as the vehicle moves forward when the amount of drive demand is sufficiently high.

19. The method according to claim 18, whereby the maintaining a predetermined amount of applied brake force as the vehicle moves forward comprises maintaining a sufficient amount of brake force to limit vehicle speed to a predetermined speed limit value.

20. A non-transitory computer readable carrier medium carrying a computer readable code for controlling a vehicle to carry out the method according to claim 13.

21. A processor arranged to implement the method of claim 14.

* * * * *